United States Patent
Sako

(10) Patent No.: US 11,467,781 B2
(45) Date of Patent: Oct. 11, 2022

(54) SYSTEM OF SETTING PERIPHERAL DEVICE AND CONTROL METHOD

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/355,609

(22) Filed: Jun. 23, 2021

(65) Prior Publication Data
US 2021/0318838 A1 Oct. 14, 2021

Related U.S. Application Data

(63) Continuation of application No. 16/849,798, filed on Apr. 15, 2020, now Pat. No. 11,068,213, which is a continuation of application No. PCT/JP2018/038414, filed on Oct. 16, 2018.

(30) Foreign Application Priority Data

Oct. 26, 2017 (JP) .............................. JP2017-207440

(51) Int. Cl.
*G06F 3/12* (2006.01)
*G06F 40/279* (2020.01)

(52) U.S. Cl.
CPC .......... *G06F 3/1205* (2013.01); *G06F 3/1232* (2013.01); *G06F 3/1292* (2013.01); *G06F 40/279* (2020.01)

(58) Field of Classification Search
CPC .... G06F 3/1205; G06F 40/279; G06F 3/1232; G06F 3/1292
See application file for complete search history.

(56) References Cited

U.S. PATENT DOCUMENTS

2010/0208297 A1* 8/2010 Takamiya .......... H04N 1/00225
358/1.15
2017/0026583 A1* 1/2017 Yasuma ................. G06V 10/40

FOREIGN PATENT DOCUMENTS

| JP | H06216831 A | 8/1994 |
| JP | 2002-082779 A | 3/2002 |
| JP | 2003-108171 A | 4/2003 |
| JP | 2017-016309 A | 1/2017 |

* cited by examiner

*Primary Examiner* — Quang N Vo
(74) *Attorney, Agent, or Firm* — Canon U.S.A., Inc. IP Division

(57) ABSTRACT

A multifunction peripheral includes means for receiving a request from a multifunction peripheral management service, means for enabling a function in the multifunction peripheral in accordance with the request, and means for transmitting a result of the request as a response to the multifunction peripheral management service.

19 Claims, 16 Drawing Sheets

FIG. 9

```
{
  "result": {
    "action": "connect",           //entity
    "parameters": {
      "device": "Printer1"         //entity
      "network": "wireless"        //entity
      "method": "direct"           //entity
    },
  },
}
```

FIG. 10

```
{
  "result": {
    "action": "connect",           //entity
    "parameters": {
      "network": "wireless"        //entity
      "method": "direct"           //entity
    },
  },
}
```

FIG. 11

```
{
  "responce": {
    "result": "success",
    "ssid": "CanonPrinter",
    "password": "1234567890",
}
```

FIG. 14

```
{
  "responce": {
  "result": "success",
   "ssid": "CanonPrinter",
   "password": "1234567890",
   "secured": true
}
```

1401 — "password": "1234567890",
1402 — "secured": true

1701
```
{
 "responce": {
 "result": "success",
  "ssid": "CanonPrinter",
  "password": "1234567890",
  "output": displayText
}
```

1702
```
{
 "responce": {
 "result": "success",
  "ssid": "CanonPrinter",
  "password": "1234567890",
  "output": speech
}
```

1703
```
{
 "responce": {
 "result": "success",
  "ssid": "CanonPrinter",
  "password": "1234567890",
  "output": displayText
  "output": speech
}
```

SYSTEM OF SETTING PERIPHERAL DEVICE AND CONTROL METHOD

CROSS-REFERENCE TO RELATED APPLICATIONS

This application is a Continuation of U.S. application Ser. No. 16/849,798, filed Apr. 15, 2020, which is a Continuation of International Patent Application No. PCT/JP2018/038414, filed Oct. 16, 2018, which claims the benefit of Japanese Patent Application No. 2017-207440, filed Oct. 26, 2017, all of which are hereby incorporated by reference herein in their entirety.

TECHNICAL FIELD

The present invention relates to a printing system and the like that supports an agent function.

BACKGROUND ART

In recent years, operations of electronic devices such as multifunction peripherals have become complicated with the advancement of functions. As a result, a user is forced to understand a complicated user interface, and an increasing burden is imposed on the user. To handle the above situation, Japanese Patent Laid-Open No. 2014-222513 has proposed a interactive agent that can be instructed and operated in a natural language.

In recent years, mobile terminals such as smartphones have become widespread, and various functions have been proposed in which a mobile terminal and a multifunction peripheral operate in cooperation. It is known to provide a function to connect wirelessly between a mobile terminal and a multifunction peripheral.

SUMMARY OF INVENTION

In a function of operating a mobile terminal and a peripheral device in cooperation with each other, a user needs to separately operate each of the multifunction peripheral and the mobile terminal. Peripheral devices and mobile terminals often have their own user interfaces. Thus, users need to learn much about them, which may be burdensome to the users. For example, there is a problem that even if a user looks at a manual of a peripheral device, enormous information makes it difficult to find necessary information. There is also a problem that it is difficult for a user to specify a parameter necessary for setting a device.

The present invention has been made in view of at least one of the above problems. A first object of the present invention is to provide a mechanism for effectively and efficiently realizing a cooperation between a mobile terminal and a peripheral device. Another object of the present invention is to effectively provide an interactive interface to a user for allowing it to perform a setting procedure to realize a cooperation between a mobile terminal and a peripheral device.

A system capable of communicating with a peripheral device and configured to provide a setting service of performing a setting process on the peripheral device, the system comprising, identifying means configured to identify, in input natural language information, a particular setting information to be set in the peripheral device, response means configured such that in a case where the particular setting information to be set in the peripheral device is not identified in the natural language information, the response means responds in a natural language to an interactive agent program to obtain the unidentified setting information, acquisition means configured to, after the response in the natural language given by the response means is output from the interactive agent program, acquire information based on the natural language information input to the interactive agent program, discrimination means configured to discriminate, based on the information acquired by the acquisition means, the setting information unidentified by the identifying means, and input means configured to input the information identified by the identifying means and the information discriminated by the discrimination means to the setting service of the peripheral device.

Further features of the present invention will become apparent from the following description of exemplary embodiments with reference to the attached drawings.

BRIEF DESCRIPTION OF DRAWINGS

FIG. 9 is a diagram illustrating an example of data of a wireless direct function start request to connect a multifunction peripheral according to an embodiment.

FIG. 10 is a diagram illustrating an example of data of a wireless direct function start request according to an embodiment.

FIG. 11 is a diagram illustrating an example of data of a wireless direct function start response according to an embodiment.

FIG. 14 is a diagram illustrating an example of data of a wireless direct function start response according to an embodiment.

FIG. 17 is a diagram illustrating an example of data of a wireless direct function start response 605 according to an embodiment.

DESCRIPTION OF EMBODIMENTS

The best mode for carrying out the present invention will be described below with reference to the drawings.

In the following description, embodiments will be described, by way of example, for a case where the invention is applied to a multifunction peripheral. Note that the present invention is a technique applicable not only to the multifunction peripheral but to many other information processing apparatuses.

Note that the scope of the present invention is not limited by the embodiments described below, and a combination of all features described in the embodiments described below does not necessarily need to implement the present invention.

Embodiment 1

Figure 1:
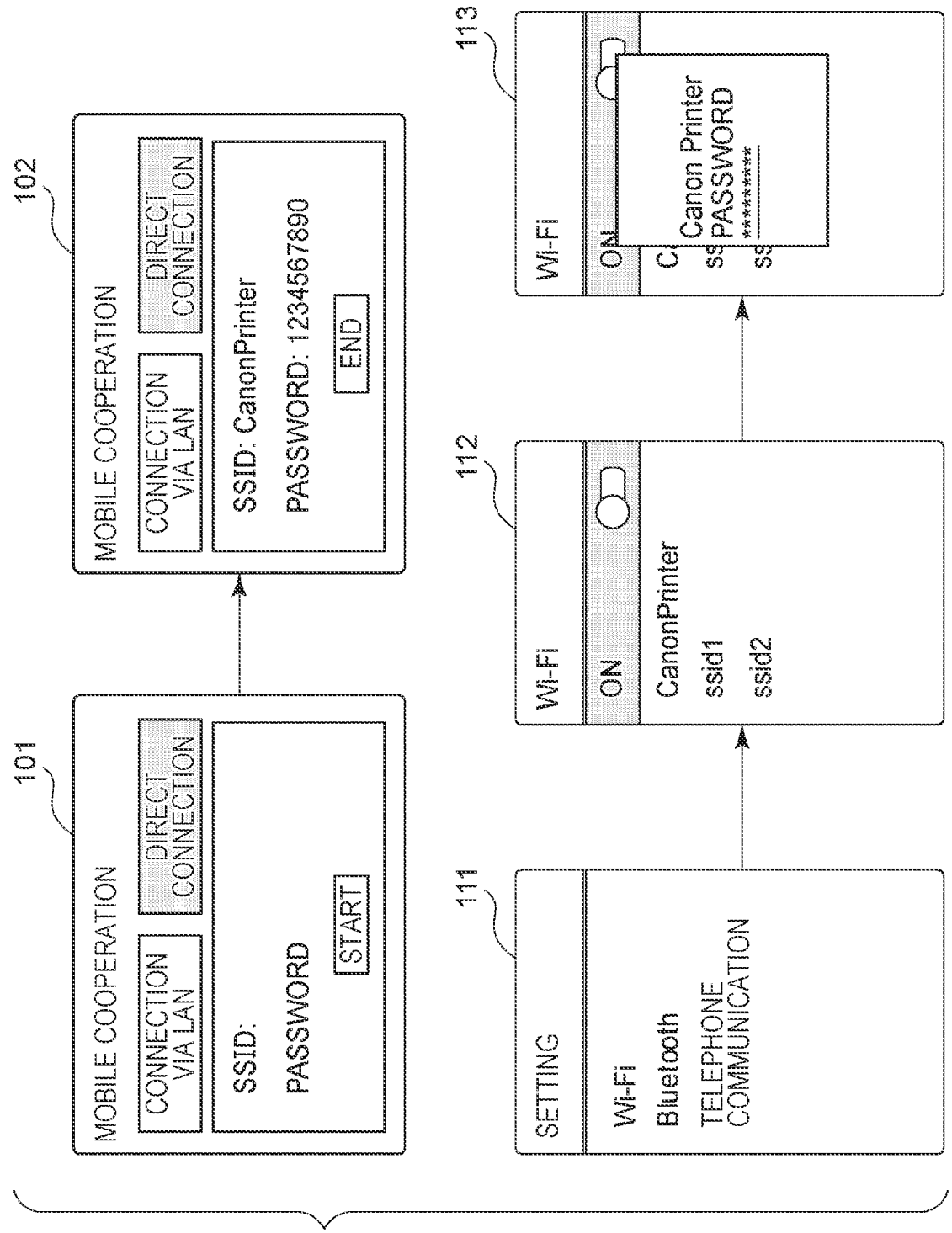
FIG. 1 is a diagram illustrating an example of a manner of operating a mobile terminal and a multifunction peripheral to make a wireless direct connection.

FIG. 1 is a diagram illustrating an example of a manner of operating a mobile terminal 150 and a multifunction peripheral 100 to make a wireless direct connection.

First, a user operates an operation panel 405 of the multifunction peripheral to input an instruction to display a mobile cooperation screen. In response, a mobile cooperation screen 101 is displayed on the operation panel 405. On the mobile cooperation screen 101, a LAN connection button for performing LAN connection setting and a direct connection button for performing direct connection setting are displayed. The user presses the direct connection button to display direct connection settings. When the user presses a start button on the direct connection setting screen, a wireless direct connection function is started. When the wireless direct connection is started, an SSID and a network key are displayed on the mobile cooperation screen 102 of the multifunction peripheral.

Next, the user operates the mobile terminal 150 to display a setting screen 111. On the setting screen 111, a Wi-Fi button for performing Wi-Fi setting is displayed. The user presses a Wi-Fi setting to display the Wi-Fi setting. On a Wi-Fi setting screen 112, SSIDs of nearby access points detected as a result of searching are searched displayed in the form of a list. When the user selects an SSID of the multifunction peripheral, a password input screen 113 is displayed. The user inputs, as a password, a network key displayed on the mobile cooperation screen 102. As a result, the mobile terminal 150 is wirelessly connected directly to the multifunction peripheral 100.

Figure 2:
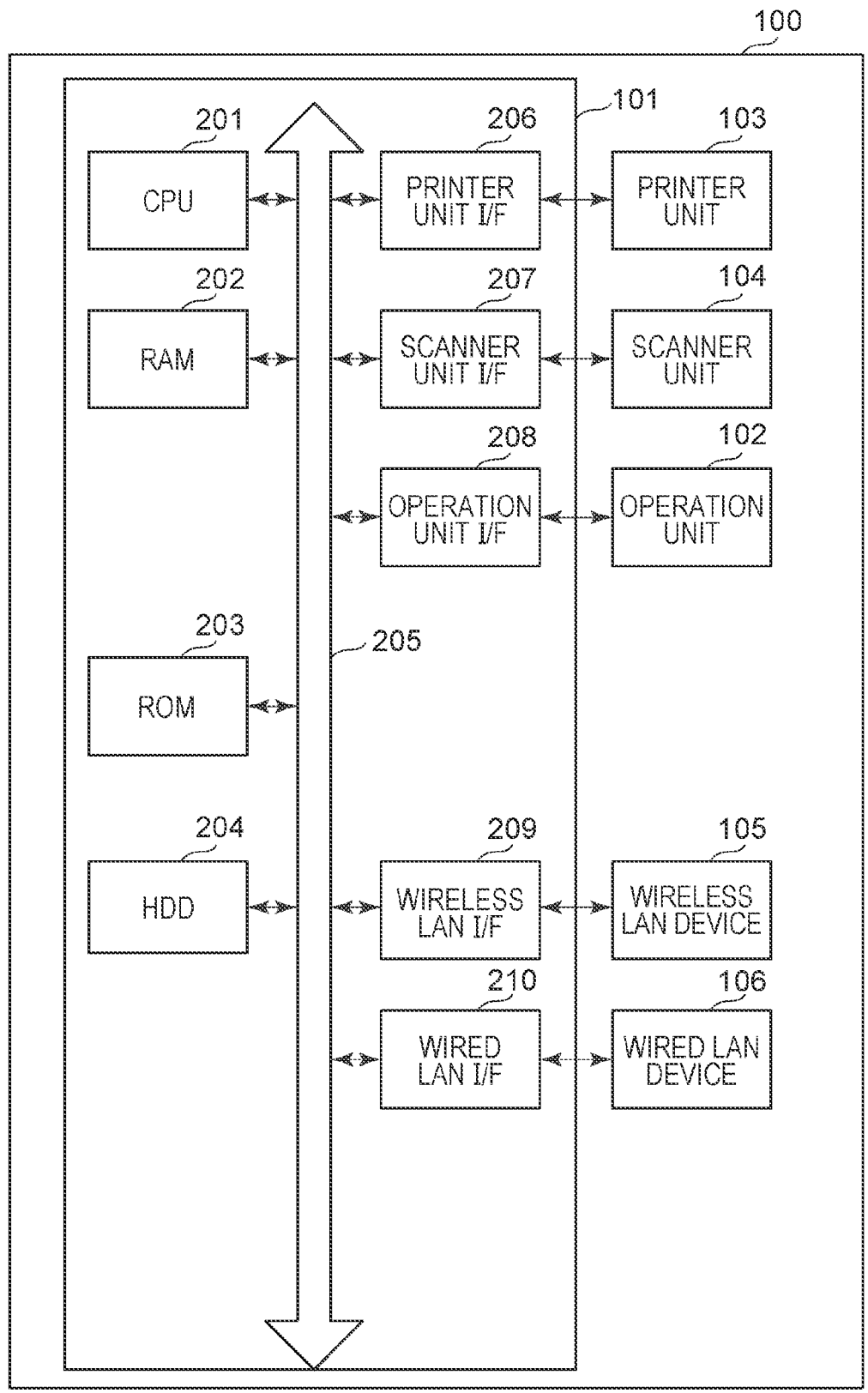
FIG. 2 is a diagram illustrating an example of a hardware configuration of a multifunction peripheral according to an embodiment.

FIG. 2 is a diagram illustrating a hardware configuration of the multifunction peripheral 100. In the present embodiment, by way of example, the multifunction peripheral 100 is assumed to be a multifunction peripheral, but the multifunction peripheral 100 may be a multifunction peripheral which does not have a scanner function.

A CPU 201 reads out a control program stored in a ROM 203 and executes various processes for controlling an operation of the multifunction peripheral 100. The ROM 203 stores the control program. A RAM 202 is used by the CPU 201 as a temporary storage area such as a main memory, a work area, or the like. An HDD 204 stores various data such as print data, scan images, and/or the like.

In the case of the multifunction peripheral 100, one CPU 201 executes each process shown in a flow chart described later, but the manner of executing processes is not limited to this example. For example, a plurality of CPUs may operate in cooperation to execute each process shown in a flow chart described later.

A printer unit 103 executes a printing process on a sheet based on print data received, via a printer unit I/F 206, from an external apparatus, or based on a scanned image generated by a scanner unit 104, or the like. The scanner unit 104 reads a document via a scanner unit I/F 207 and generates a scanned image (read image data). The scanned image generated by the scanner unit 104 is printed by the printer unit 103. The scanned image is also stored in the HDD 204.

An operation unit 102 includes a liquid crystal display unit having a touch panel function and a keyboard, and displays various images. The user can input an instruction and information to the multifunction peripheral 100 via the operation unit 102. The operation unit 102 is connected to a controller unit 101 via an operation unit I/F 208.

A wired LAN interface unit 210 executes a wired LAN communication with an external apparatus via a wired LAN device 106.

A wireless LAN interface unit 209 executes a wireless LAN communication with an external apparatus such as an access point 110 via a wireless LAN device 105.

Blocks in the controller unit 101 are connected to each other via a system bus 205.

Figure 3:
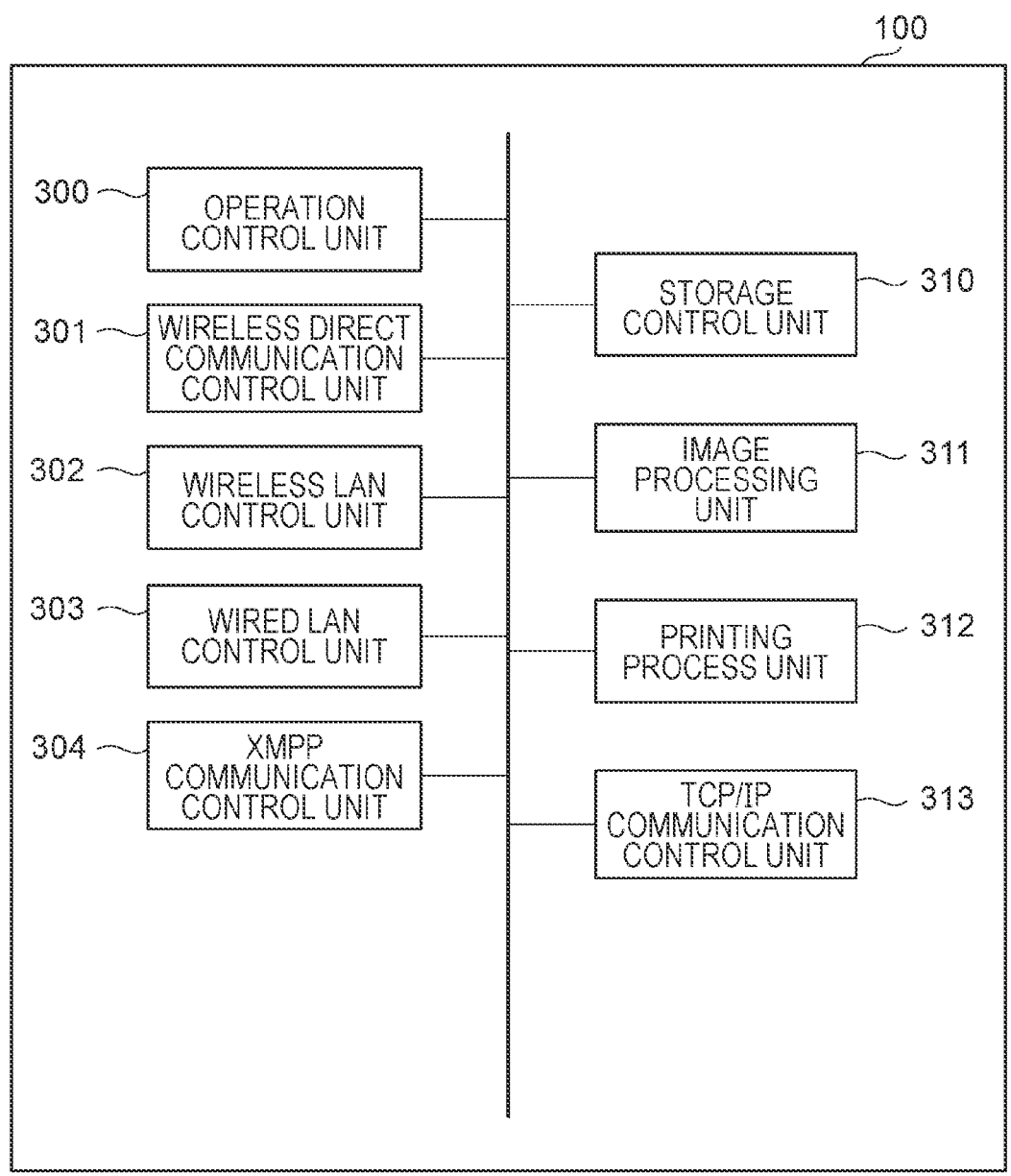
FIG. 3 is a diagram illustrating an example of a software configuration of a multifunction peripheral according to an embodiment.

FIG. 3 is a diagram for explaining a software configuration of the multifunction peripheral 100. Each functional unit illustrated in FIG. 3 is realized by the CPU 201 of the multifunction peripheral 100 by executing a control program.

An operation control unit 300 controls the operation unit 102. The operation control unit 300 displays an operation menu on the operation unit 102 and waits for an instruction to be input by the user. A content of the received instruction is notified to another functional unit, and an instruction result is displayed on the operation unit 102.

A wireless direct control unit 301 performs wireless direct communication control.

A wireless LAN control unit 302 controls connection, disconnection, and communication of the wireless LAN.

A wired LAN control unit 303 controls connection, disconnection, and communication of the wired LAN.

An HTTP communication control unit 304 performs XMPP communication control.

The storage control unit 310 stores specified data in the ROM 203 or the HDD 204, or reads out the stored data, according to an instruction from another functional unit. Examples of data managed by the storage control unit 305 include data related to IP address setting and proxy setting of the multifunction peripheral 100.

An image processing unit 311 performs a process of rendering a print job into image data for printing.

The printing process unit 312 performs a process of transmitting the image data rendered by the image processing unit 311 as an image signal to the printer unit 103 via the printer unit I/F 206 and printing the image data.

The TCP/IP communication control unit 313 controls TCP/IP communication.

Figure 4:
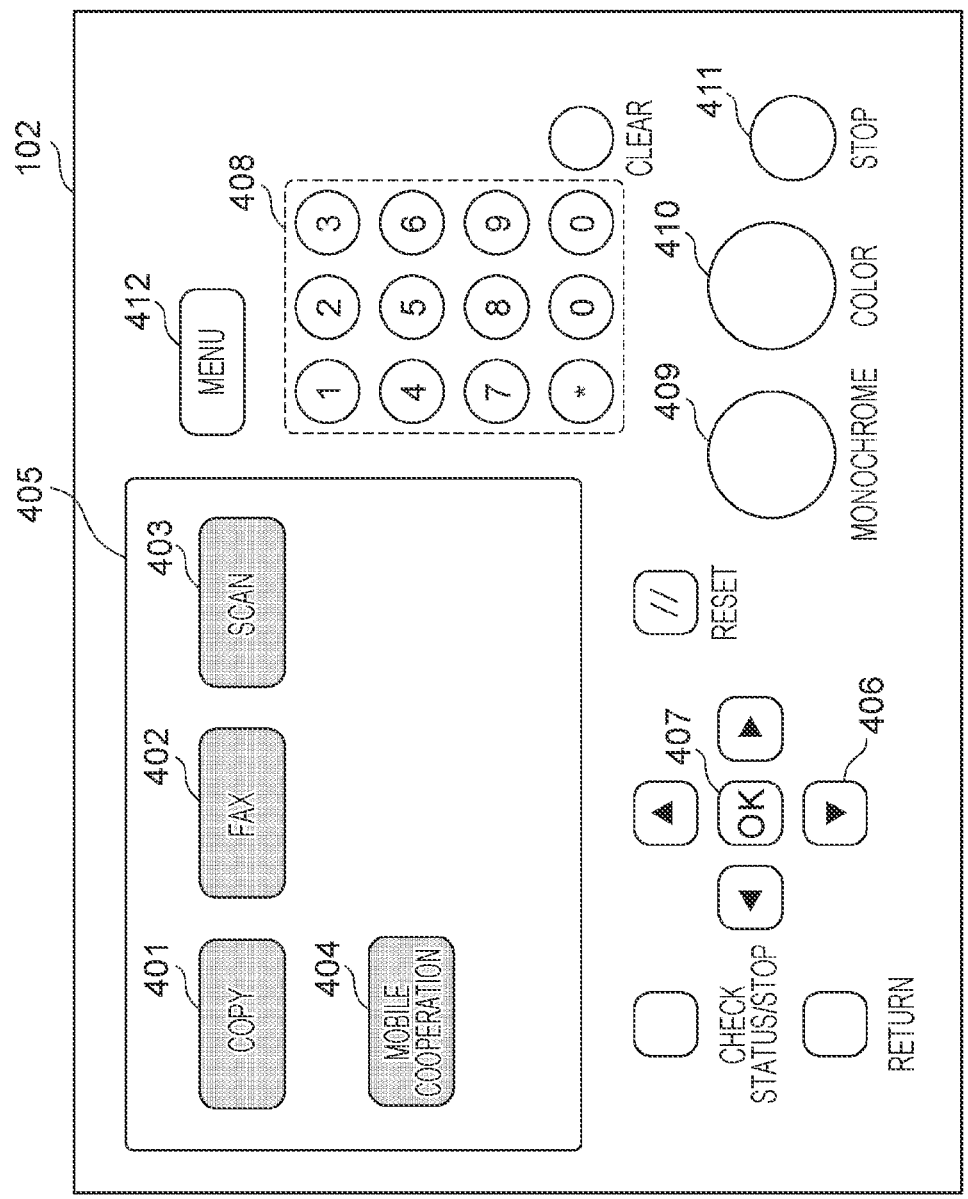
FIG. 4 is a diagram illustrating an example of an operation panel of a multifunction peripheral according to an embodiment.

FIG. 4 is a diagram for explaining the operation unit 102 of the multifunction peripheral 100. Reference numeral 405 denotes a display panel using an LCD or the like. Reference numeral 401 denotes a button which is pressed to perform copying using the multifunction peripheral 100. When this button is pressed, a copy operation screen is displayed on the display panel 405. Reference numeral 402 denotes a button which is pressed to perform a facsimile operation using the multifunction peripheral 100. When this button is pressed, a facsimile operation screen is displayed on the display panel 405. Reference numeral 403 denotes a button which is pressed to perform a scan operation using the multifunction peripheral 100. When this button is pressed, a scan operation screen is displayed on the display panel 405. Reference numeral 404 denotes a button which is pressed to perform an operation for realizing an cooperation between the multifunction peripheral 100 and the mobile terminal. When the button 404 is pressed, a mobile cooperation screen is displayed on the display panel 405. A reference numeral 408 denotes a numeric keypad which is used to input a number and the like. Reference numeral 407 denotes an OK key, which is used to finally accept the contents displayed on the display panel 405. Reference numeral 406 denotes an arrow key which is used to select a menu or the like displayed on the display panel 405. Buttons 409 and 410 are respectively used to execute black-and-white copying and color copying. A button 411 is used to stop processing. A button 412 is used to display a menu screen for setting the multifunction peripheral 100. A button 404 is used to display a menu screen for performing various operations related to the mobile cooperation. This button is selected to start a wireless direct connection.

Figure 5:
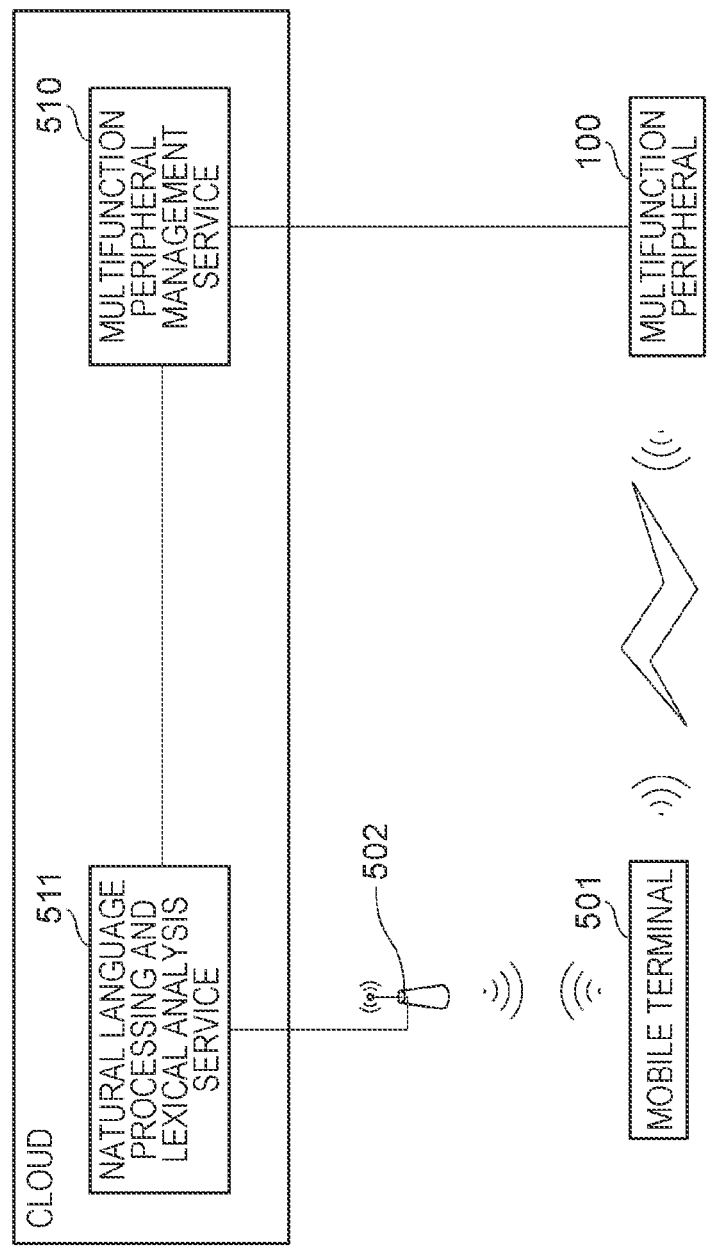
FIG. 5 is a diagram illustrating an example of an of a network according to an embodiment.

FIG. 5 is a network diagram for explaining a network configuration according to the present embodiment. The mobile terminal 501 communicates with a natural language processing and lexical analysis service 511 via an access point 502. More specifically, the interactive agent on the mobile terminal 501 receives an operation from the user in a natural language, and transfers it to the natural language processing and lexical analysis service 511. Alternatively, the mobile terminal 501 may directly connect to the multifunction peripheral 100 via wireless direct communication. The natural language processing and lexical analysis service 511 is a service provided on the cloud. When the natural language processing and lexical analysis service 511 receives the operation by the user from the interactive agent on the mobile terminal 501 in the natural language, the natural language processing and lexical analysis service 511 performs natural language processing and analyzes extracted tokens. According to a result, communication is performed with the multifunction peripheral management service 510, which is a service provided on the cloud. The multifunction peripheral management service 510, which is a service provided on the cloud, communicates with the multifunction peripheral 100 based on the communication with the natural language processing and lexical analysis service 511.

Figure 6:
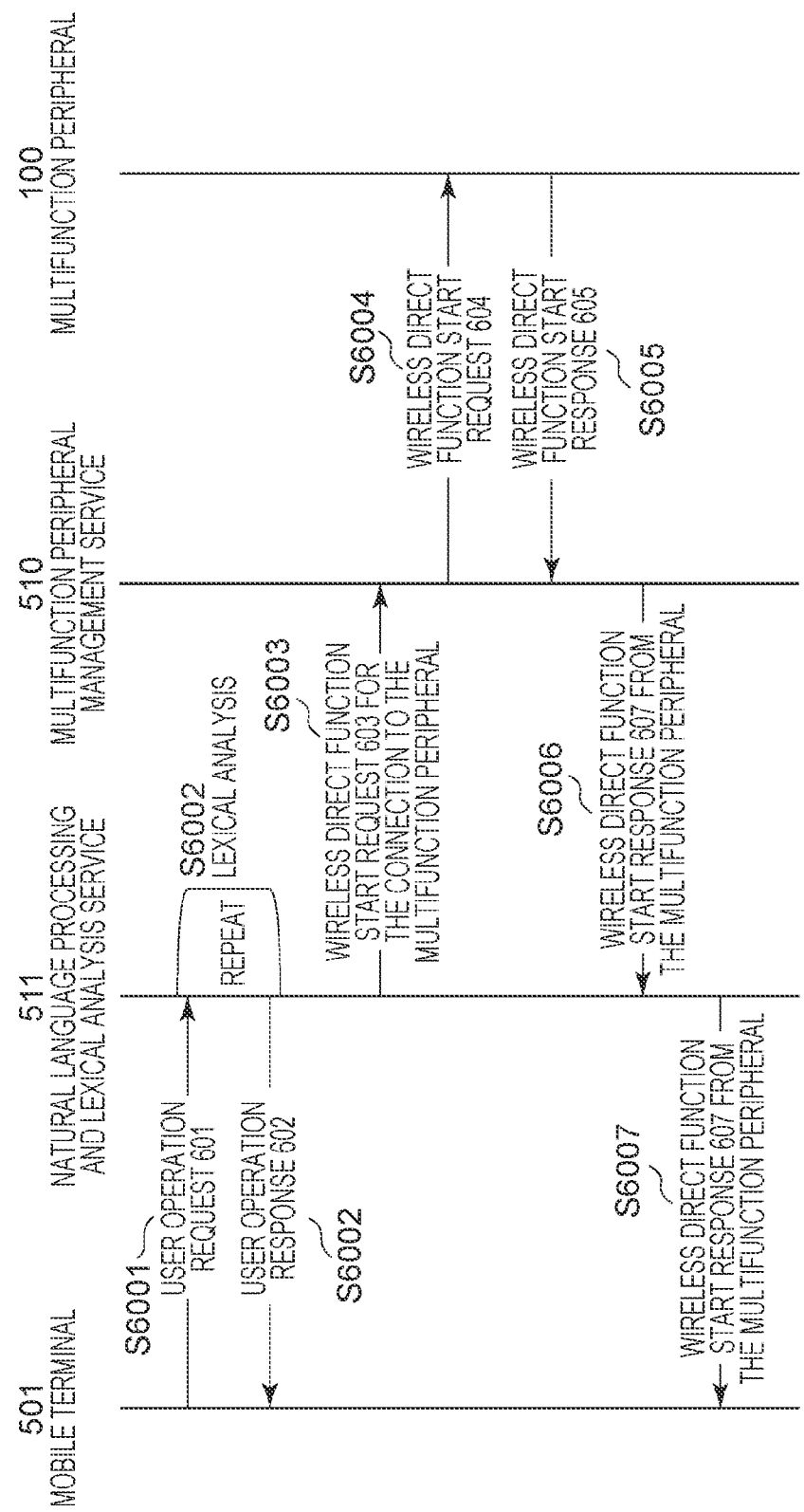
FIG. 6 is a diagram illustrating an example of a sequence according to an embodiment.

FIG. 6 is a sequence diagram for explaining a processing sequence according to the present embodiment. When the interactive agent on the mobile terminal 501 receives an operation from the user in the natural language, the interactive agent transmits a user operation request 601 expressed in the natural language to the natural language processing and lexical analysis service 511 (S6001). The natural language processing and lexical analysis service 511 performs natural language processing on the user operation request 601 and performs lexical analysis (S6002). In a case where the result of the analysis does not include all preregistered information, the natural language processing and lexical analysis service 511 transmits a user operation response 602 expressed in the natural language to the mobile terminal 501 (S6002). The mobile terminal 501 and the natural language processing and lexical analysis service 511 repeat the above-described communication until all necessary information is obtained. When all necessary information is obtained via the process described above, the natural language processing and lexical analysis service 511 sends a wireless direct function start request 603 for the connection to the multifunction peripheral to the multifunction peripheral management service 510 (S6003). In the natural language processing and lexical analysis service 511, necessary information and Webhook which is a process to be executed when all necessary information is obtained are registered in advance. Webhook provides a mechanism for sending information in an HTTP protocol POST request when an event occurs.

That is, the lexical analysis service 511 receives the user operation request 601, performs natural language processing, and extracts information necessary for the wireless direct function start request 603. The lexical analysis service 511 repeats the above-described processing until all information necessary for the wireless direct function start request 603 is obtained. When all preregistered information necessary for the wireless direct function start request 603 is obtained, it is determined that a corresponding event has occurred. In response, a Webhook corresponding to the event is activated, and the wireless direct function start request 603 of the multifunction peripheral is encapsulated in a POST request in the HTTP protocol and transmitted.

As described above, the wireless direct function start request 603 of the multifunction peripheral is realized by the Webhook. When the multifunction peripheral management service 510 receives the wireless direct function start request 603 for the connection with the multifunction peripheral from 511, the multifunction peripheral management service 510 transmits a wireless direct function start request 604 to the multifunction peripheral 100 (S6004). The transmission from the multifunction peripheral management service 510 located on the cloud to the multifunction peripheral 100 is performed using push communication using a protocol such as XMPP. Usually, the multifunction peripheral 100 is located in an intranet, and push communication from the service on the cloud is realized by using push communication using XMPP. When the multifunction peripheral 100 receives the wireless direct function start request 604, the multifunction peripheral 100 starts the wireless direct function of the multifunction peripheral 100. The multifunction peripheral 100 then returns an SSID and a network key as a wireless direct function start response 605 to the multifunction peripheral management service 510 (S6005). The multifunction peripheral management service 510 sends the SSID and the network key as a wireless direct function start response 606 in the natural language to the natural language processing and lexical analysis service 511 (S6006). The natural language processing and lexical analysis service 511 sends, to the interactive agent of the mobile terminal 501, wireless direct function start response 607 from the multifunction peripheral represented in the natural language (S6007).

Figure 7:
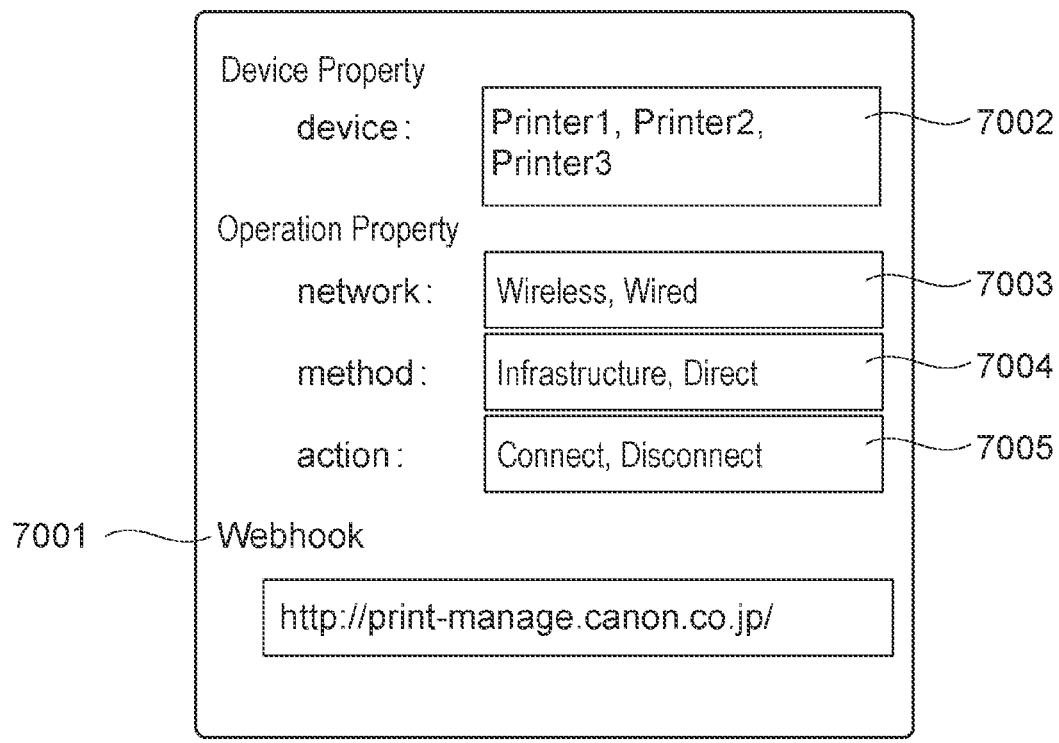
FIG. 7 is a diagram illustrating an example of a registered content of an action according to an embodiment.

FIG. 7 is a diagram for explaining a content of action registration according to the present embodiment. The action registration is information registered in the natural language processing and lexical analysis service 511, and includes an entity indicating necessary information and an action defined for a corresponding entity. To allow action registration, screen information such as that shown in FIG. 7 is transmitted from the natural language processing and lexical analysis service 511 to a PC (not shown) or the mobile terminal (501). The screen information is displayed on the PC or the mobile terminal (501). To make action registration, information is input via the screen information shown in FIG. 7. In response, the information is transmitted from the PC or the mobile terminal (501) to the natural language processing and lexical analysis service 511 and is registered. In the present embodiment, the entities include "device", "network", "method", and "action". The entity "device" is information identifying a multifunction peripheral to be operated. Printer1, Printer2, or Printer3 are registered in advance as multifunction peripherals that can be specified. The entity "network" identifies a network type to be used. Either a wireless network or a wired network are allowed to be specified as the network type. The entity "method" identifies an connection method. Either an infrastructure connection or a direct connection are allowed to be specified as the connection method. The entity "action" identifies an operation. Either connection or disconnection are allowed to be identified as the operation.

In the present embodiment, a connection/disconnection to/from a Webhook provided at http://print-manage.canon.co.jp is registered as the action.

When the action registration described above is made, and all entities of "device", "network", "method", and "action" are provided via the dialogue in S6001 and S6002, an operation is performed as follows. That is, an action is executed to transmit the above-described pieces of information to http://print-manage.canon.co.jp using HTTP. This action is executed by the natural language processing and lexical analysis service 511. That is, a service described in Webhook can be called using parameters of "device", "network", "method", and "action" as arguments. The execution timing thereof is when all entities of "device", "network", "method", and "action" are obtained.

Figure 8:
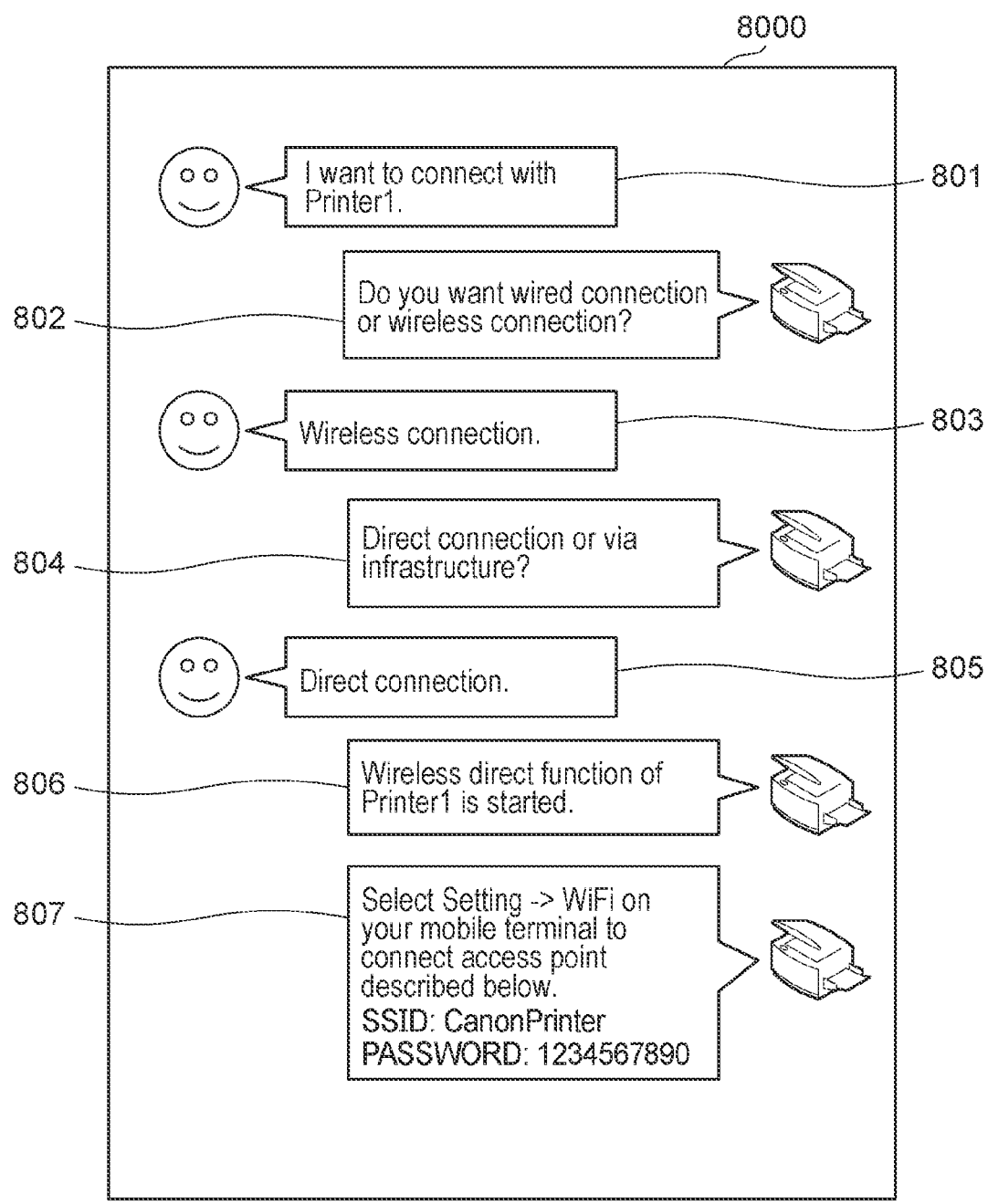
FIG. 8 is a diagram illustrating an example of an operation of an interactive agent according to an embodiment.

In FIG. 8, 8000 shows an example of an operation of an interactive agent according to the present embodiment. First, a user downloads a setting application or a setting service from a particular server and starts the setting application or the setting service. Then, the user holds a particular button down. When the setting application or the service detects holding-down of the particular button, the setting application or service goes into an interactive mode. While keeping a state in which the interactive agent screen is displayed on the mobile terminal 501, the user issues, in 801, a natural language voice instruction to request a connection with Printer1 via a microphone of the mobile terminal 501. In response, 801 is displayed. Alternatively, the connection request represented in the natural language may be input by performing a key input operation on a touch panel of the mobile terminal 501. In response, 801 is displayed. In FIG. 8, reference numerals 801, 803, and 805 indicate information input by the user from the mobile terminal 501 by a voice or key inputting. 802, 804, 806, and 807 indicate natural language data displayed by the natural language processing and lexical analysis service 511 in response to transmission to the setting application or the setting service.

The mobile terminal 501 transmits the input natural language data (801) to the natural language processing and lexical analysis service 511. The natural language processing and lexical analysis service 511 analyzes the input data. The natural language processing and lexical analysis service 511 analyzes the input natural language data. The input natural language data is divided into phrases and words. Thereafter, a noun is extracted from the words. Furthermore, extracted nouns are classified into proper nouns and other nouns. Thereafter, it is determined whether "information for executing an action" registered in FIG. 7 is completely included in the classified entities. The result of the determination indicates that "information for executing the action" is insufficient. In a case where it is determined that information is insufficient, the mobile terminal 501 transmits an inquiry for specifying "network" expressed in a natural language. The interactive agent of the mobile terminal 501 outputs the received inquiry 802.

The user transmits, in 803, a notification in a natural language using the interactive agent on the mobile terminal 501 to request a wireless network as the "network". The mobile terminal 501 transmits the input natural language data to the natural language processing and lexical analysis service 511. The natural language processing and lexical analysis service 511 analyzes the input data. The result of the analysis indicates that information for executing the action registered in FIG. 7 is still insufficient, and thus an inquiry for specifying the "method" expressed in the natural language is transmitted to the mobile terminal 501. The interactive agent of the mobile terminal 501 outputs the received inquiry 804.

In 805, the user transmits a notification in the natural language using the interactive agent on the mobile terminal 501 to request direct connection as "method". The mobile terminal 501 transmits the input natural language data to the natural language processing and lexical analysis service 511 (S6001). The natural language processing and lexical analysis service 511 analyzes the input data in a similar manner as described above. If the result of the analysis indicates that all information for executing the action registered in FIG. 7 is acquired, the following processing is performed. That is, a wireless direct function start request 603 for the connection to the multifunction peripheral is transmitted to the multifunction peripheral management service 510 using Webhook (S6003). Note that the multifunction peripheral management service 510 corresponds to the URL of the Webhook 7001 input in FIG. 7. The multifunction peripheral management service 510 transmits a wireless direct function start response 606 for the connection to the multifunction peripheral to the natural language processing and lexical analysis service 511 in accordance with the sequence shown in FIG. 6 (S6006).

The natural language processing and lexical analysis service 511 transmits a content of the wireless direct function start response 606 for the connection to the multifunction peripheral to the mobile terminal 501 (S6007). The interactive agent of the mobile terminal 501 outputs the received response messages 806 and 807.

In the present embodiment described above, it is assumed by way of example that outputting is performed by the interactive agent of the mobile terminal 501 such that a text is displayed on a screen. However, alternatively, a voice/sound may be output. The text and the voice/sound may be output simultaneously.

FIG. 9 illustrates an example of data of the wireless direct function start request 603 for the connection to the multifunction peripheral according to the present embodiment. The wireless direct function start request 603 for the connection to the multifunction peripheral described above with reference to FIG. 6 includes the information defined for the action described in FIG. 7. More specifically, it includes entity information of "device", "network", "method", and "action". These pieces of information are expressed as data in JavaScript (registered trademark) Object Notation (JSON) format. In the present embodiment, the wireless direct function start request 603 is transmitted to the multifunction peripheral management service 510 using Webhook, that is, an HTTP POST request.

FIG. 10 illustrates an example of data of the wireless direct function start request 604 according to the present embodiment. The wireless direct function start request 604 described above with reference to FIG. 6 includes the information defined for the action described in FIG. 7. More specifically, it includes entity information of "network", "method", and "action". These pieces of information are expressed as data in the JSON format. The "device" information is already identified at this point, and thus the "device" information does not need to be included in the data. In the present embodiment, the wireless direct function start request 604 is transmitted to the multifunction peripheral 100 using an XMPP protocol.

FIG. 11 illustrates an example of data of the wireless direct function start response 605 according to the present embodiment. In "result", the result of the wireless direct function start is described. In the present embodiment, "success" indicating a success is set in "result". In "ssid", "ssid" information related to the multifunction peripheral 100 is described. In "password", network key information related to the multifunction peripheral 100 is described. In the present embodiment, the wireless direct function start response 605 is transmitted to the multifunction peripheral management service 510 using an XMPP protocol.

Figure 12:
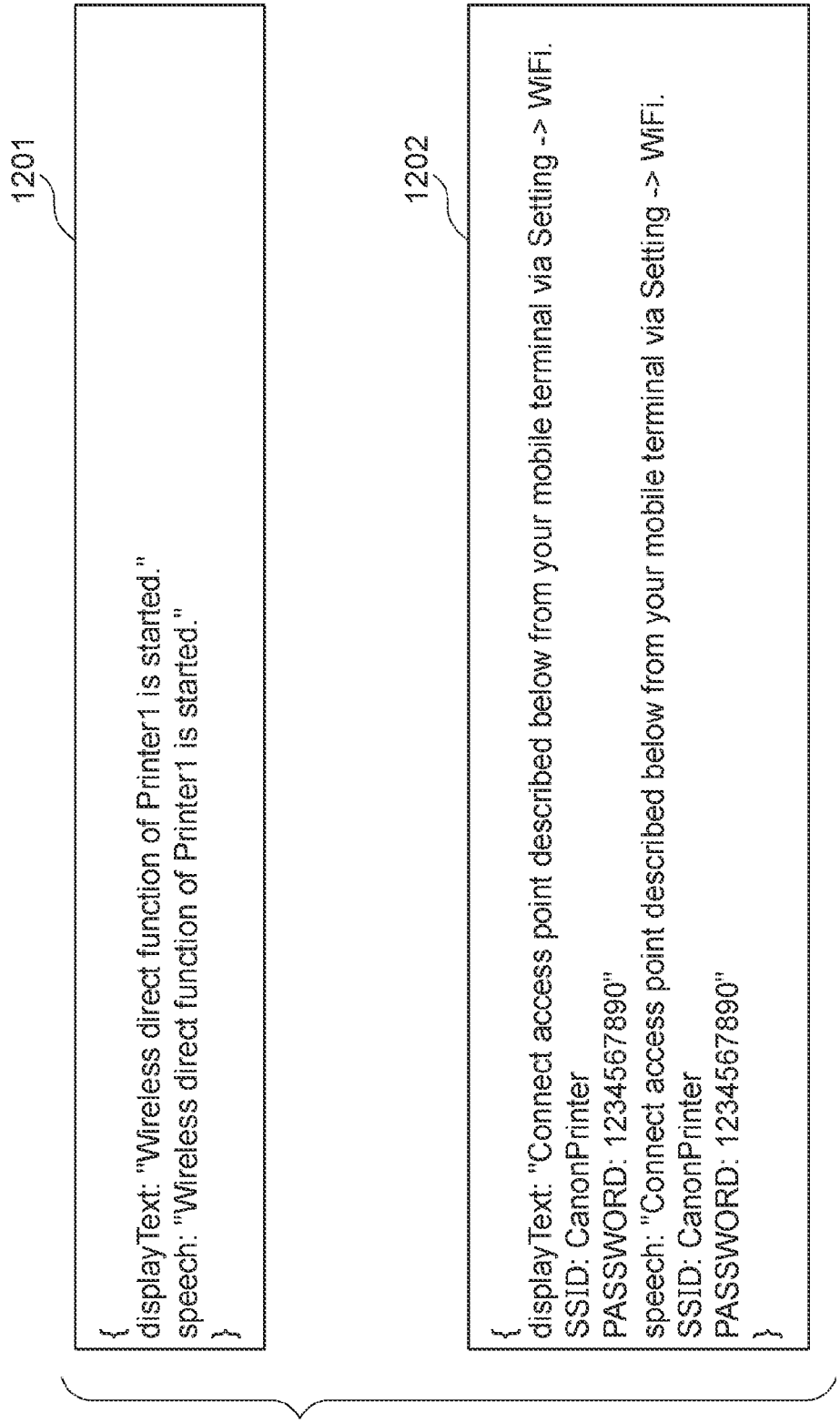
FIG. 12 is a diagram illustrating an example of data of a wireless direct function start request to connect a multifunction peripheral according to an embodiment.

FIG. 12 illustrates an example of data of the wireless direct function start response 606 for the connection to the multifunction peripheral according to the present embodiment. "displayText" instructs the interactive agent of the mobile terminal 501 to display a text on the screen. "speech" instructs the interactive agent of the mobile terminal 501 to output a voice/sound. In 1201, a result of the wireless direct function start is returned in a natural language as a response.

In 1202, SSID and PASSWORD of the multifunction peripheral 100 and a content of an operation of the mobile terminal 501 are returned in a natural language as a response. In the present embodiment, the wireless direct function start response 605 is transmitted, as an HTTP POST request, to the natural language processing and lexical analysis service 511.

Figure 13:
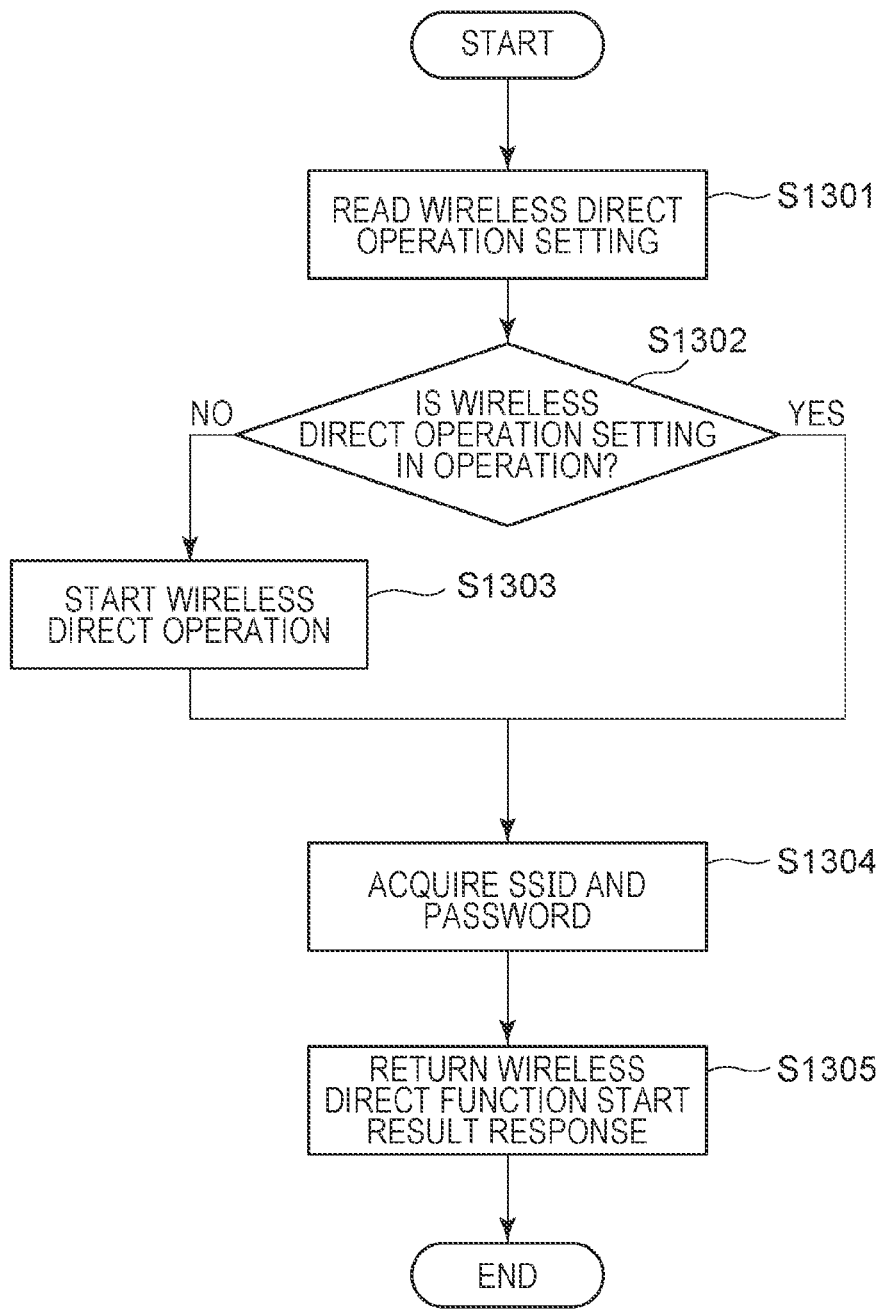
FIG. 13 is a flow chart illustrating a process performed by a multifunction peripheral according to an embodiment.

FIG. 13 is a flow chart illustrating a process performed by the multifunction peripheral according to the present embodiment. When the multifunction peripheral 100 receives the wireless direct function start request 604 from the multifunction peripheral management service 510 (S6004), the multifunction peripheral 100 reads wireless direct setting from the storage unit 310 in S1301. In S1301, the multifunction peripheral 100 determines whether a value of the wireless direct setting is in operation. In a case where it is in operation, then in S1304, the multifunction peripheral 100 reads SSID and PASSWORD information from the storage unit 310. If it is not in operation, then in S1303, the wireless direct communication control unit 301 of the multifunction peripheral 100 starts the wireless direct communication. Thereafter, the multifunction peripheral 100 performs the process in S1304 described above. Next, in S1305, the XMPP communication control unit 304 of the multifunction peripheral 100 returns, as a response, a result of the wireless direct function start to the multifunction peripheral management service 510. S1304 corresponds to S6005.

Embodiment 2

In EMBODIMENT 1, it is allowed to arbitrarily specify displaying a text on the screen or outputting a voice/sound as the outputting performed by the interactive agent of the mobile terminal 501. However, in a case where the output data includes confidential data such as PASSWORD, it is desirable not to use a voice in outputting. In EMBODIMENT 2, the above situation is taken into account.

FIG. 14 illustrates an example of data of the wireless direct function start response 605 according to EMBODIMENT 2. In "result", the result of the wireless direct function start is described. In the present embodiment, "success" indicating a success is set in "result". In "ssid", "ssid" information related to the multifunction peripheral 100 is described. In "password" (1401), key information related to the multifunction peripheral 100 is described. Furthermore, information "secured" is also described to indicate whether or not the above-described pieces of information are secure. In the present embodiment, the output data includes the password, and thus "true" is set in "secured" (1402).

In the present embodiment, the wireless direct function start response 605 is transmitted to the multifunction peripheral management service 510 using an XMPP protocol. After the process from S6001 to S6004 is performed, 605 is issued in S6005.

Figure 15:
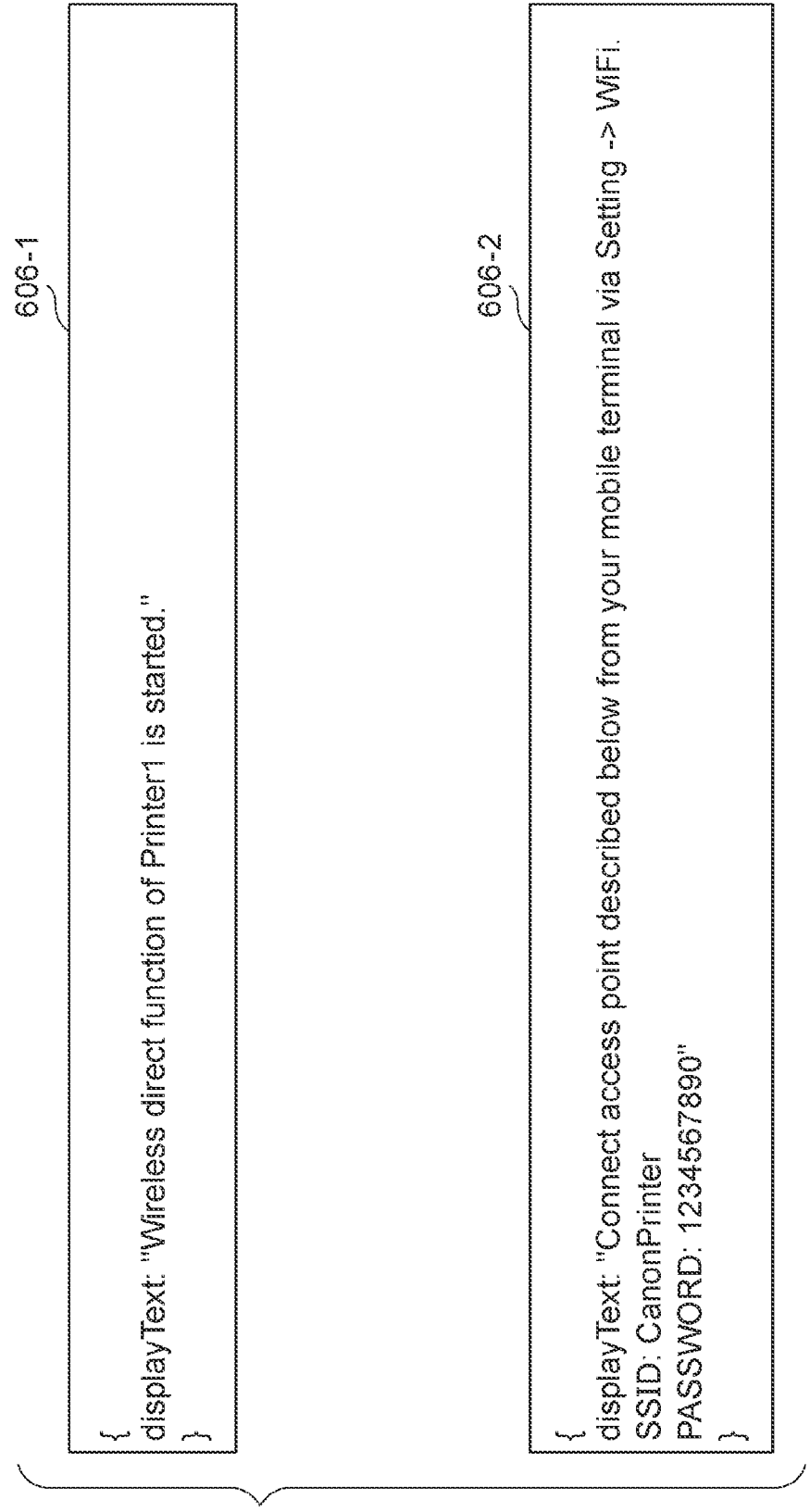
FIG. 15 is a diagram illustrating an example of data of a wireless direct function start response according to an embodiment.

FIG. 15 illustrates an example of data of the wireless direct function start response 606 of the multifunction peripheral according to EMBODIMENT 2. In 606-1, a result of the start of the wireless direct function is returned as a response in a natural language. In 606-2, the SSID and PASSWORD of the multifunction peripheral 100 and the content of the operation on the mobile terminal 501 are returned as a response in a natural language.

The multifunction peripheral management service 510 analyzes the wireless direct function start response 605, shown in FIG. 14, received in S6005. As a result, a "Secure" tag 1402 is found. Thus, it is determined that the received information related to 605 is secure. Therefore, "displayText" is specified such that outputting of a voice/sound is not allowed and only outputting of text on the screen is allowed as the method of outputting to the interactive agent of the mobile terminal 501 (FIG. 15).

Embodiment 3

In EMBODIMENT 2, outputting of text on a screen or outputting of a voice is automatically selected as the method of the outputting performed by the interactive agent of the mobile terminal 501 depending on whether 605 includes confidential data or not. Embodiment 3 discloses an example in which the multifunction peripheral 100 has setting for controlling the method of outputting performed by the interactive agent, and issues an instruction to the multifunction peripheral management service 510 according to the setting.

Figure 16:
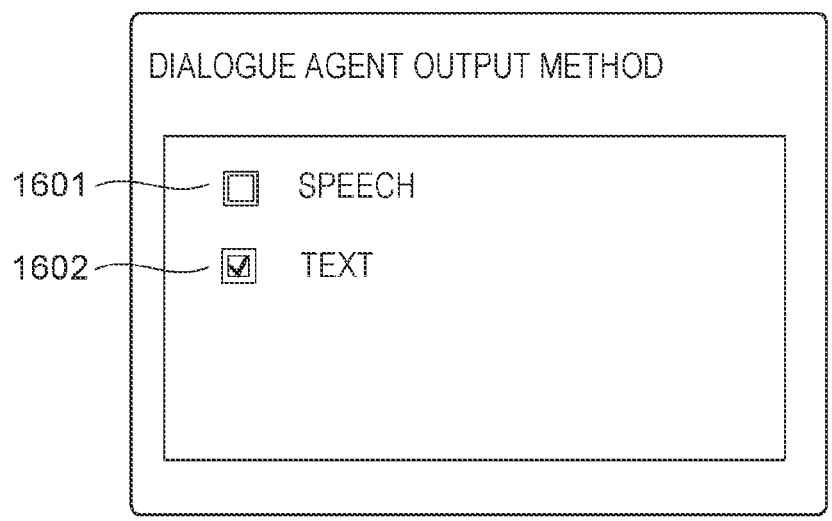
FIG. 16 is a diagram illustrating an example of a screen for setting an interactive agent output method according to an embodiment.

FIG. 16 is a diagram illustrating an example of a screen for setting, on the multifunction peripheral 100, the output method to be employed by the interactive agent according to EMBODIMENT 3. On this setting screen, voice/sound outputting and text outputting can be set to be enabled or disabled as the output method. This setting screen is displayed on the operation unit 102 of the multifunction peripheral 100.

FIG. 17 illustrates an example of data of the wireless direct function start response 605 according to EMBODIMENT 3. 1701 denotes an example of data for a case where only text outputting is enabled in FIG. 16. In "output" indicating the output method, only "displayText" is set. 1702 denotes an example of data for a case where only the voice/sound outputting enabled in FIG. 16. In "output" indicating the output method, only "speech" is set. 1703 denotes an example of data for a case where both text outputting and voice/sound outputting are enabled in FIG. 16. In "output" indicating the output method, "displayText" and "speech" are set. In a case where "displayText" is specified as the output method, displaying is performed on the mobile terminal, while in a case where "speech" is specified as the output method, a voice/sound response is performed by the mobile terminal.

That is, in a case where only 1601 in FIG. 16 is ON, 1702 is output, while in a case where only 1602 is ON, 1701 is output. In a case where both 1601 and 1602 are ON, 1703 is output.

1701 to 1703 are transmitted from the multifunction peripheral 100 to the multifunction peripheral management service 510 in S6005 in FIG. 6. Then, they are further transmitted to 511. 511 controls 501 to perform processing according to 1701 to 1703.

Figure 18:
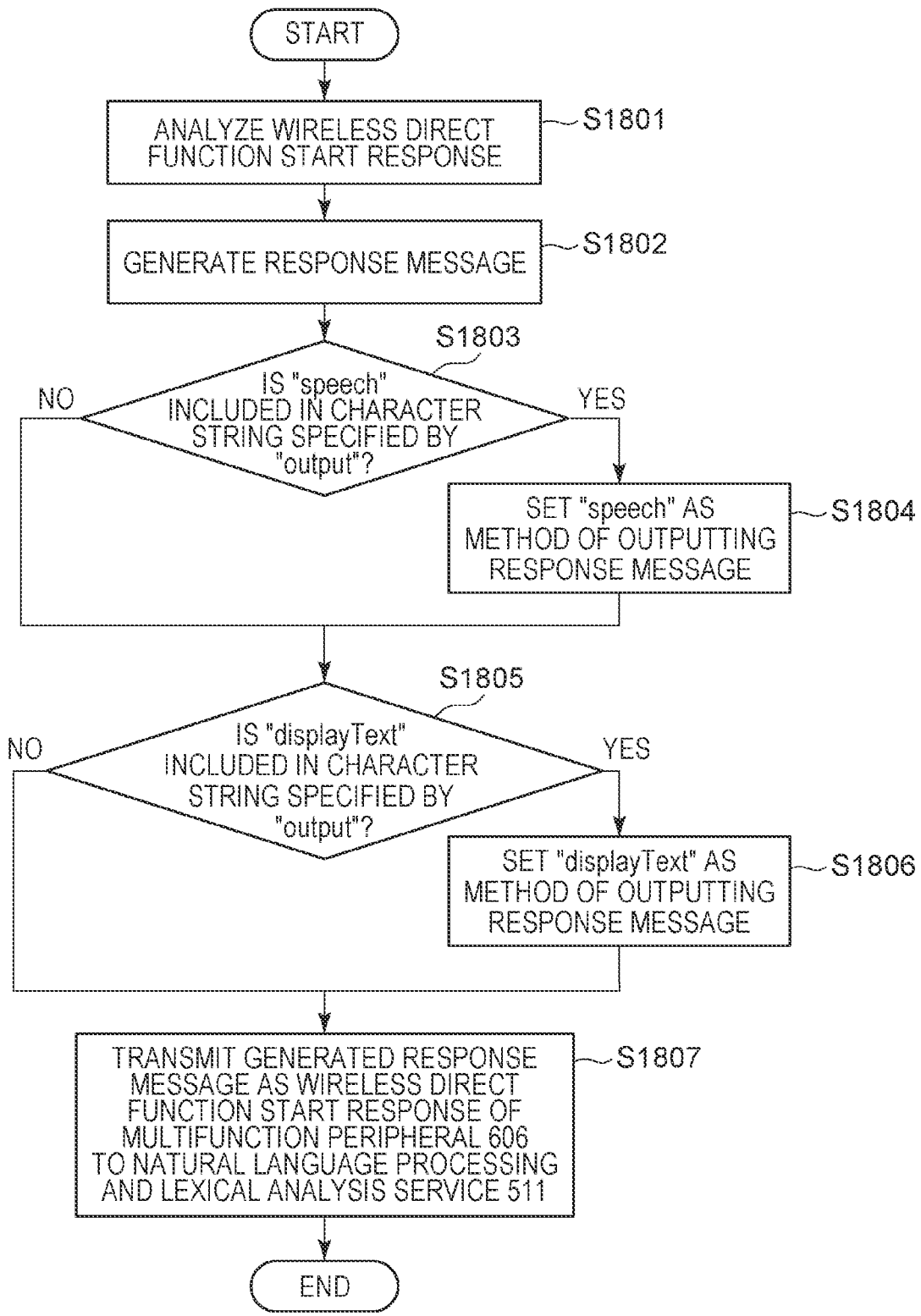
FIG. 18 is a flow chart illustrating an example of a process related to a multifunction peripheral management service according to an embodiment.

FIG. 18 is a flow chart illustrating a process of the multifunction peripheral management service 510 according to EMBODIMENT 3. Upon receiving the wireless direct function start response 605 described above with reference to FIG. 17, the multifunction peripheral management service 510 analyzes the received start response 605 in S1801. Next, the multifunction peripheral management service 510 generates a response message in S1802. More specifically, in the case of the example in FIG. 17, the response message is "The wireless direct function of Printer1 has been started. Connect to the following access point by selecting "Setting ->Wi-Fi" on the mobile terminal. SSID: CanonPrinter PASSWORD: 1234567890".

Next, in S1803, the multifunction peripheral management service 510 determines whether or not "speech" is specified in "output" included in the wireless direct function start response 605. The output means is set in "output". In a case where "speech" is specified, speech is set as the output method of the response message in S1804. As a result, speech is added to the response message.

Next, in S1805, the multifunction peripheral management service 510 determines whether or not "displayText" is specified in "output" included in the wireless direct function start response 605. In a case where "displayText" is specified, displayText is set as the output method of the response message in S1806. As a result, displayText is added to the response message.

Next, the multifunction peripheral management service 510 transmits the response message generated in S1807, as the wireless direct function start response 606 of the multifunction peripheral, to the natural language processing and lexical analysis service 511.

Each time the wireless direct function start response 605 is received, FIG. 18 is executed. As described also in FIGS. 8, 802 and 804 are processed by the natural language processing and lexical analysis service 511 and results are returned. That is, they correspond to the repeated processes 601 and 602 in FIG. 6. When the wireless direct function start response 605 is received and FIG. 18 is executed, then, as a result, 806 and 807 are displayed.

As examples of peripheral devices, the multifunction peripheral 100 having a printing function and a printer have been described above. However, the peripheral device may be a communication device such as a laser smartphone. As an example of a setting service capable of communicating with the communication device and configured to perform a setting process on the peripheral device, the multifunction peripheral management service 510 has been described above. As examples of the setting information, 7002 to 7005 in FIG. 7 have been described. As examples of the natural language information, 801 to 807 in FIG. 8 have been described. Note that particular setting information to be set in the multifunction peripheral 100 is identified from the input natural language information.

If a case where the particular setting information to be set in the multifunction peripheral 100 is not identified in the message of natural language information, then, in order to obtain the unidentified setting information, a response expressed in a natural language is sent to the interactive agent program. The natural language processing and lexical analysis service 511 is an example of the interactive agent program.

When the natural language processing and lexical analysis service 511 outputs a response in the natural language, information based on the natural language input to the service 511 is obtained.

Then, the unidentified setting information is discriminated based on the information obtained based on the input. The resultant identified information and the discriminated information are input to the multifunction peripheral management service 510.

The service 511 repeatedly transmits a response in a natural language to the mobile terminal 501 until a particular number of pieces of setting information are obtained. The particular number of pieces of setting information include a print destination. The particular number of pieces of setting information include setting information related to wireless communication.

When the identified information and the discriminated information are input to the multifunction peripheral management service 510, the wireless access point in the multifunction peripheral 100 is enabled to communicate. Information for communicating with the wireless access point in the multifunction peripheral 100 may be output to the service 511. These processes can be executed by a CPU in the system, that is, a computer.

By allowing an interactive agent and a multifunction peripheral to operate using a service on a cloud, it becomes possible to operate the multifunction peripheral in a natural language. This makes it possible for a user to easily operate the multifunction peripheral and the mobile terminal.

The present invention is not limited to the embodiments described above, but various changes and modifications are possible without departing from the spirit and the scope of the present invention. In order to make the scope of the present invention public, the following claims are attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A system comprising:
   a server system communicable with an audio control device and an information processing apparatus,
   wherein the server system includes at least one processor that causes the server system to act as:
      a first transmission unit configured to transmit instruction information acquired via the audio control device to the information processing apparatus; and
      a second transmission unit configured to transmit response information corresponding to a response to the instruction information from the information processing apparatus,
   wherein the information processing apparatus includes at least one processor that causes the information processing apparatus to act as:
      a third transmission unit configured to transmit, to the server system, a response to the instruction information transmitted by the first transmission unit,
   wherein the second transmission unit transmits the response information by including therein information regarding whether to perform audio output, whereby controls whether the audio control device perform audio output of the response information.

2. The system according to claim 1, wherein the third transmission unit transmits the response by including therein attribute information regarding whether to perform audio output.

3. The system according to claim 1, wherein the second transmission unit transmits the response information by including therein information regarding either to perform audio output or screen output, whereby the audio control device controls either to output the response information by audio output or screen output.

4. The system according to claim 1, wherein, in a case where the response information contains secure information, the second transmission unit transmits the response information by including therein information that inhibits the audio output.

5. The system according to claim 1, wherein the information processing apparatus performs processing based on the instruction information transmitted by the first transmission unit.

6. The system according to claim 1, wherein the instruction information is instruction information for performing wireless communication with the information processing apparatus.

7. The system according to claim 6, wherein the response the third transmission unit transmits includes at least one of an SSID and a password.

8. The system according to claim 6, wherein the information processing apparatus starts the wireless communication based on the instruction information transmitted by the first transmission unit.

9. The system according to claim 1, wherein the information processing apparatus is a printer having a print function.

10. The system according to claim 1, wherein the instruction information is instruction information for causing the information processing apparatus to perform printing.

11. The system according to claim 1, wherein the server system inquires a user via the audio control device until the instruction information including necessary settings for performing processing by the information processing apparatus is acquired.

12. The system according to claim 1, wherein the response information includes a plurality of pieces of output information for performing output by the audio control device, and the second transmission unit sets information regarding whether to perform audio output to each piece of the output information.

13. The system according to claim 1, wherein the instruction information is information corresponding to the instruction input to the audio control device by a user in natural language.

14. A server system communicable with an information processing apparatus and communicable with an audio control device,
wherein the server system includes at least one processor that causes the server system to act as:
an acquisition unit configured to identify setting information necessary for causing the information processing apparatus to perform predetermined processing from information input via the audio control device; and
an inquiry unit configured to make inquiry to a user via the audio control device until the setting information necessary for causing the information processing apparatus to perform the predetermined processing based on the acquired setting information is acquired.

15. The server system according to claim 14, wherein inquiry information is transmitted to the audio control device until the setting information necessary for causing the information processing apparatus to perform the predetermined processing is acquired.

16. The server system according to claim 14, wherein information input via the audio control device is natural language information.

17. The server system according to claim 14, wherein the setting information includes a print setting.

18. A method comprising:
transmitting, by a server system communicable with an audio control device and an information processing apparatus, instruction information acquired via the audio control device to the information processing apparatus;
transmitting, from the information processing apparatus to the server system, a response to the instruction information transmitted by the server system; and
transmitting, by the server system, response information corresponding to the response to the instruction information from the information processing apparatus,
wherein the transmitting the response information includes transmitting the response information by including therein information regarding whether to perform audio output, whereby controls whether the audio control device perform audio output of the response information.

19. A method comprising:
at a server system communicable with an information processing apparatus and communicable with an audio control device:
identifying setting information necessary for causing the information processing apparatus to perform predetermined processing from information input via the audio control device; and
making inquiry to a user via the audio control device until the setting information necessary for causing the information processing apparatus to perform the predetermined processing based on the acquired setting information is acquired.

* * * * *